(12) United States Patent
Ghiron et al.

(10) Patent No.: US 7,058,261 B2
(45) Date of Patent: Jun. 6, 2006

(54) INTERFACING MULTIPLE WAVELENGTH SOURCES TO THIN OPTICAL WAVEGUIDES UTILIZING EVANESCENT COUPLING

(75) Inventors: Margaret Ghiron, Allentown, PA (US); Prakash Gothoskar, Allentown, PA (US); Robert Keith Montgomery, Easton, PA (US); Vipulkumar Patel, Monmouth Junction, NJ (US); Soham Pathak, Allentown, PA (US); Kalpendu Shastri, Orefield, PA (US); Katherine A. Yanushefski, Zionsville, PA (US)

(73) Assignee: SiOptical, Inc., Allentown, PA (US)

( * ) Notice: Subject to any disclaimer, the term of this patent is extended or adjusted under 35 U.S.C. 154(b) by 0 days.

(21) Appl. No.: 10/935,146

(22) Filed: Sep. 7, 2004

(65) Prior Publication Data

US 2005/0094939 A1 May 5, 2005

Related U.S. Application Data

(60) Provisional application No. 60/500,184, filed on Sep. 4, 2003.

(51) Int. Cl.
*G02B 6/34* (2006.01)

(52) U.S. Cl. ............................... 385/36; 385/30; 385/31
(58) Field of Classification Search ...................... None
See application file for complete search history.

(56) References Cited

U.S. PATENT DOCUMENTS 3,883,221 A 5/1975 Rigrod 3,905,676 A * 9/1975 Ulrich ........................ 385/36
4,978,187 A * 12/1990 Minemura et al. ............ 385/14
5,101,458 A * 3/1992 Spaulding et al. ............ 385/36
5,420,947 A * 5/1995 Li et al. ........................ 385/37

OTHER PUBLICATIONS

L.A. Coldren, Y.A. Akulova, E.M. Strzelecka, B.J. Thibeault, J.C. Ko and D.A. Louderback, " VCSEL Array Packaging for Free Space Interconnects" University of California, Report 1996-1997 for Micro Project 96-050.

(Continued)

*Primary Examiner*—Kaveh Kianni

(57) ABSTRACT

An arrangement for achieving and maintaining high efficiency coupling of light between a multi-wavelength optical signal and a relatively thin (e.g., sub-micron) silicon optical waveguide uses a prism coupler in association with an evanescent coupling layer. A grating structure having a period less than the wavelengths of transmission is formed in the coupling region (either formed in the silicon waveguide, evanescent coupling layer, prism coupler, or any combination thereof) so as to increase the effective refractive index "seen" by the multi-wavelength optical signal in the area where the beam exiting/entering the prism coupler intercepts the waveguide surface (referred to as the "prism coupling surface"). The period and/or duty cycle of the grating can be controlled to modify the effective refractive index profile in the direction away from the coupling region so as to reduce the effective refractive index from the relatively high value useful in multi-wavelength coupling to the lower value associated with maintaining confinement of the optical signals within the surface waveguide structure, thus reducing reflections along the transition region.

24 Claims, 12 Drawing Sheets

OTHER PUBLICATIONS

R. Ulrich, "Optimum Excitation of Optical Surface Waves" Journal of the Optical Society of America, vol. 61, No. 11, Nov. 1971.

Hiroshi Nishihara, Masamitsu Haruna, Toshiaki Suhara, "Optical Integrated Circuits", 1985.

P.K. Thien, R. Ulrich, "Theory of Prism—Film Coupler and thin-Film Light Guides" Journal of the Optical Society of America, vol. 60, No. 10, Oct. 1970.

\* cited by examiner

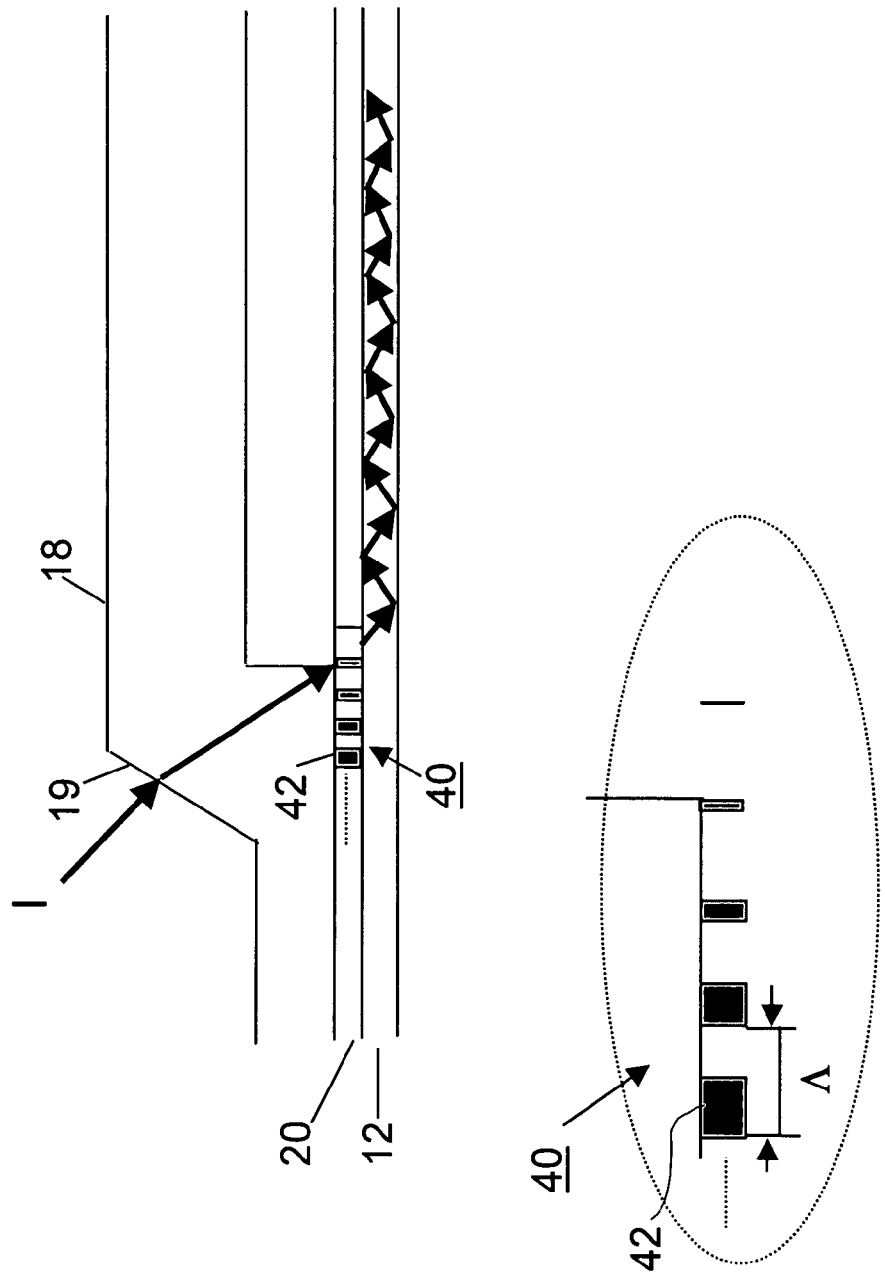

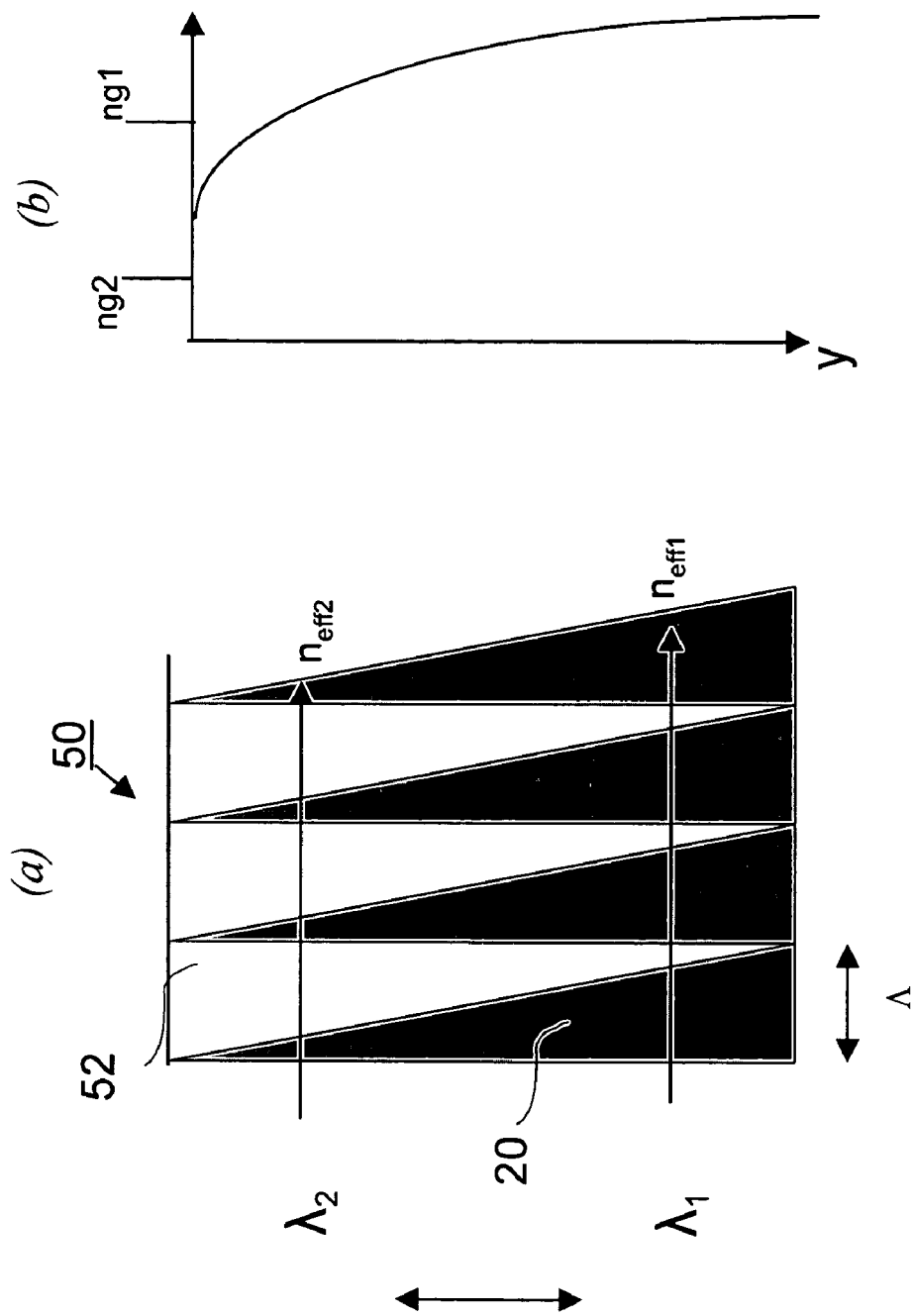

INTERFACING MULTIPLE WAVELENGTH SOURCES TO THIN OPTICAL WAVEGUIDES UTILIZING EVANESCENT COUPLING

CROSS-REFERENCE TO RELATED APPLICATION

The present application claims the priority of Provisional Application No. 60/500,184 filed Sep. 4, 2003.

TECHNICAL FIELD

The present invention relates to a system and methodology for coupling multiple wavelength optical signals to a relatively thin silicon surface waveguide and, more particularly, to the use of an evanescent coupling region to achieve multiple wavelength coupling.

DESCRIPTION OF THE PRIOR ART

To meet the bandwidth requirements of current and future high speed communication applications, state-of-the-art telecommunication components and systems must provide a host of sophisticated signal processing and routing functions, in both the optical and electronic domains. As the complexity level increases, the integration of more functions and components within a single package becomes required to meet various system-level requirements and reduce the associated size and cost of the complete system. It has been recognized for some time that the integrated circuit devices, processes and techniques that revolutionized the electronics industry can be adapted to produce optoelectronic integrated circuits. In typical optoelectronic integrated circuits, light propagates through waveguides of high refractive index materials such as, for example, silicon, gallium arsenide, indium phosphide, lithium niobate and the like. The use of these high index materials enables smaller device sizes, since a higher degree of mode confinement and smaller bend radii may be realized. While all transmitter, signal processing and receiver functions may be incorporated in a single optoelectronic integrated circuit, the system may alternatively be constructed from a number of smaller packaged elements, referred to as "hybrid optoelectronic integration" or "multi-module optoelectronic integration".

One issue associated with the use of optoelectronic integrated circuits is the problem of coupling light into and out of a planar waveguide structure, particularly a relatively thin (i.e., sub-micron) waveguide structure. An early attempt at developing a coupling arrangement for laboratory use is disclosed in U.S. Pat. No. 3,883,221 issued to William W. Rigrod on May 13, 1975. In particular, Rigrod discloses the use of a prism structure with a grating feature formed in one surface for coupling light into a thin-film (for example, GaAs) surface waveguide. The Rigrod structure is particularly configured to generate a first-order diffracted beam, where with appropriate beam steering an input optical signal may be coupled into the GaAs waveguide. The Rigrod prism element is designed for laboratory use as a way to perform non-destructive testing of multiple waveguides formed on various substrate structures, and was not used or intended for use as a permanent coupling arrangement. Moreover, the grating structure of Rigrod is found to be limited to diffracting a first-order mode of the light beam and is generally used for steering a particular input signal beam. As a result, this Rigrod structure remains incapable of efficiently coupling a relatively large range of wavelengths into a relatively thin surface waveguide layer.

Indeed, another aspect of advancing optical communication systems is the utilization of wavelength division multiplexed (WDM) systems to economically transmit large amounts of information between network nodes. The utilization of a plurality of different wavelengths to carry information signals from one point to another results in the need to either replicate the required system components for each wavelength (i.e., each system "tuned" to its own wavelength), or provide for wavelength insensitivity in the arrangement itself. As mentioned above, the Rigrod device of the prior art does not exhibit such wavelength insensitivity.

A relatively new field of optics is based on the use of silicon as the integration platform, forming the necessary optical and electrical components on a common silicon substrate. The ability to couple an optical signal into and out of a silicon substrate (particularly, to a sub-micron thick silicon surface waveguide layer) is a problem that is the subject of current research, as discussed in our co-pending application Ser. Nos. 10/668,947 and 10/720,372 on the subject of prism coupling and herein incorporated by reference. The coupling problem becomes exacerbated in WDM systems, since the coupling must be relatively wavelength insensitive, providing adequate coupling efficiency over the entire wavelength range of interest. Further, the problem of providing adequate coupling efficiency is also present in some "single wavelength" sources (particularly, uncompensated sources) that are subject to wavelength variation as a function of temperature, age, etc.

SUMMARY OF THE INVENTION

The need remaining in the prior art is addressed by the present invention, which relates to a system and methodology for coupling multiple wavelength optical signals into a relatively thin silicon surface waveguide and, more particularly, to the use of an evanescent coupling region in combination with a permanently attached prism coupler to achieve multiple wavelength coupling.

In accordance with the present invention, a sub-wavelength grating structure is incorporated within an evanescent coupling structure that is disposed between a prism coupling facet and the surface silicon waveguide layer. The grating period is sufficiently small (i.e., "sub-wavelength") so that diffraction is essentially confined to the zeroth order mode, allowing for the evanescent coupling structure to be modeled as a thin film with a refractive index $n_{eff}$ determined by the refractive indexes of the materials comprising the grating and evanescent coupling structure, as well as the duty cycle of the grating.

In one embodiment, the period of the sub-wavelength grating may be varied along its length (i.e., "chirped") to achieve a specific profile for the effective refractive index. It has been found that if the effective refractive index exhibits an appropriate variation in magnitude, multiple wavelengths (all applied as an input at the same angle of incidence) can be coupled into a relatively thin silicon surface waveguide. The variation in the refractive index of the evanescent coupling structure may also be important in single source embodiments, and used to compensate for wavelength variation associated with the light source.

In formation, the grating may be formed at the interface between an evanescent coupling layer and the silicon surface waveguide, at the interface between the prism coupler and the evanescent coupling layer, or even etched within the surface of the silicon waveguide or prism coupler. Another material (for example, silicon dioxide) may be added to "fill" an etched grating, where the difference in refractive index between the "fill" and the grating is used to determine the effective refractive index. In one exemplary embodiment, silicon nitride (with an approximate refractive index of 2 in the wavelength range of interest) may be used to form the evanescent coupling layer. In general, as long as the index of refraction of the waveguide is greater than that of the evanescent coupling structure, confinement of the optical signal will be achieved. Indeed, it is possible in accordance with the present invention to eliminate the need for a separate evanescent coupling layer by forming a grating in either the waveguide or prism coupler that yields the desired effective refractive index profile.

Other embodiments and aspects of the present invention will become apparent during the course of the following discussion and by reference to the accompanying drawings.

BRIEF DESCRIPTION OF THE DRAWINGS

Referring now to the drawings,

FIG. 11 contains a side view of an exemplary prism coupler and grating structure that exhibits an effective refractive index profile which reduces from a relatively high value in the coupling region to a lower value in the confinement region, the reduction introduced by modifying the duty cycle of the grating structure; and FIG. 12 contains a top view of an alternative exemplary grating structure that exhibits a variation in duty cycle (and, therefore, $n_{\text{eff}}$) across the width (y-axis direction) of the grating structure, allowing for beam steering to be used to locate the optimal $n_{\text{eff}}$ associated with a particular wavelength value.

DETAILED DESCRIPTION

Figure 1:
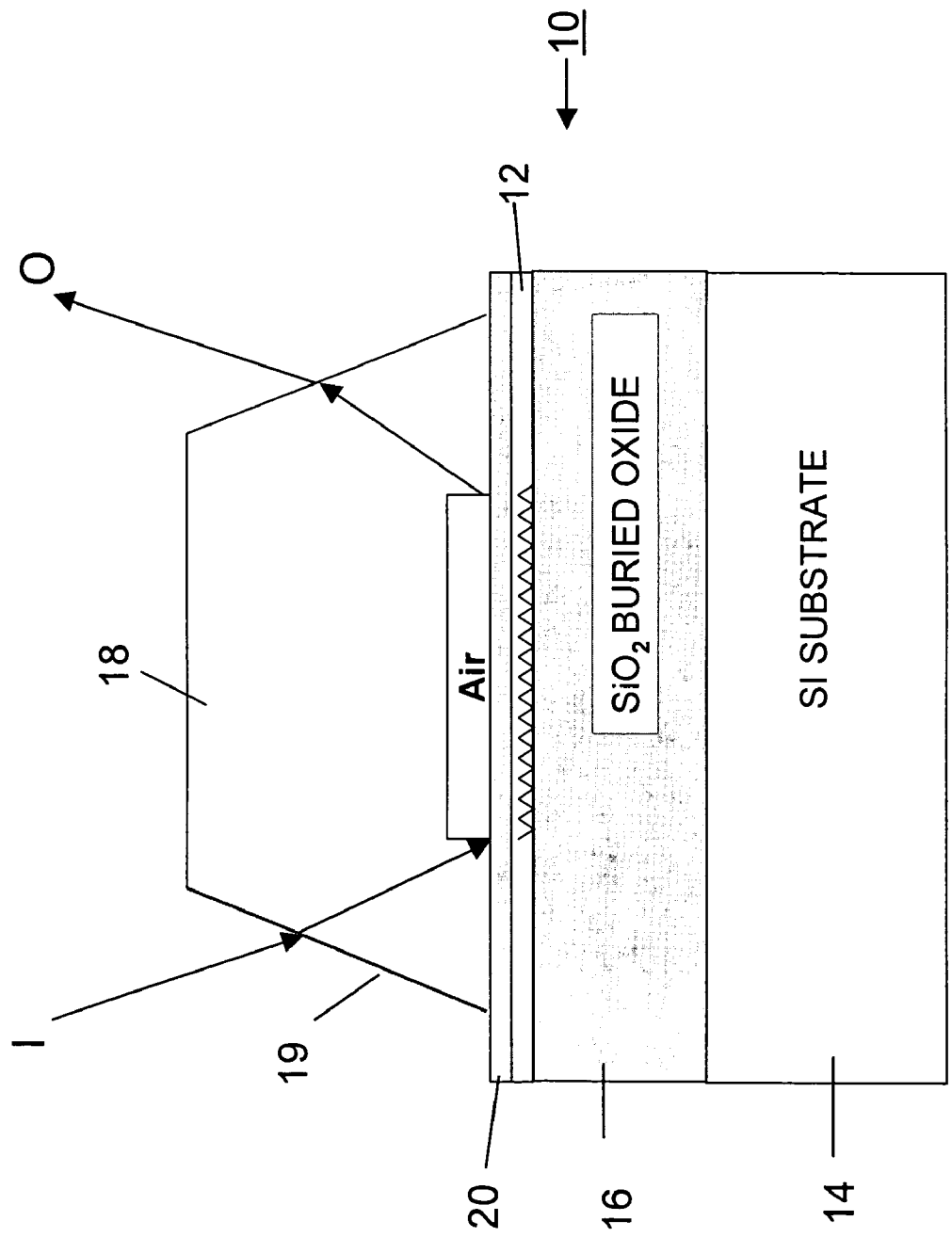
FIG. 1 illustrates an exemplary prism arrangement for coupling light into and out of a relatively thin, silicon planar optical waveguide.

An exemplary arrangement utilizing prism coupling to bring light into and out of a relatively thin silicon waveguide is illustrated in FIG. 1. In this particular example, an SOI wafer 10 includes a relatively thin (sub-micron) silicon waveguide layer 12 that is separated from a silicon substrate 14 by a buried oxide layer 16. A prism coupling device 18 is utilized to couple an external lightwave beam I into silicon waveguide layer 12, as shown. An evanescent coupling layer 20, disposed between silicon waveguide layer 12 and prism coupling device 18 is used in this case to affect the coupling between the components. As discussed in our co-pending applications, the refractive index of evanescent coupling layer 20 is selected to be less than the indexes of prism coupler 18 and silicon waveguide 12 so that efficient guiding within waveguide layer 12 is achieved and maintained. Both prism coupling device 18 and SOI wafer 10 are preferably fabricated using conventional wafer-level semiconductor processing techniques. The material that forms evanescent coupling layer 20 may be deposited on either component, with the two joined using appropriate wafer-to-wafer bonding techniques.

Figure 2:
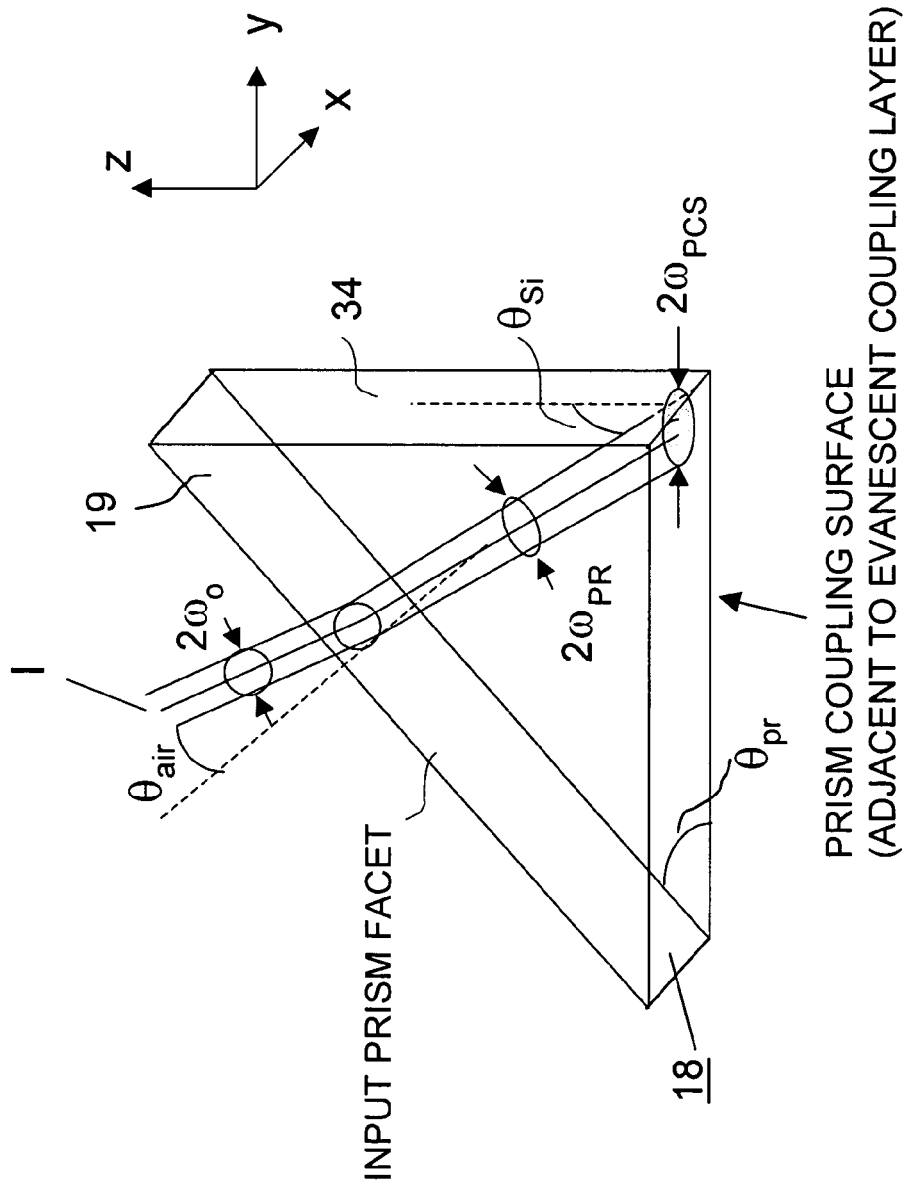
FIG. 2 contains a diagram of an idealized prism coupler, defining the various angles and surfaces associated with prism coupling.

FIG. 2 is an idealized diagram of prism coupler 18 that is useful in understanding the optics associated with prism coupling in accordance with the present invention. As shown, the input beam must be launched at an angle of incidence that is determined by the wavelength and polarization state of light, the refractive indexes and thicknesses of silicon waveguide layer 12 and evanescent coupling layer 20, as well as the refractive indexes of buried oxide layer 16, prism coupler 18 and the surrounding medium (typically "air"). As illustrated in FIG. 2, there are two relevant angles: (1) $\theta_{Si}$, the beam angle in the prism relative to the normal of the SOI wafer plane; and (2) $\theta_{air}$, the angle of incidence on prism input coupling facet 19 (as measured from the normal to facet 19). The value of $\theta_{Si}$ is determined by the wavelength and polarization state of the incoming light, the refractive indexes and thicknesses of silicon waveguide layer 12 and evanescent coupling layer 20, and the refractive indexes of buried oxide layer 16 and prism coupler 18. The value for $\theta_{air}$ is then determined by applying Snell's law at the prism/air interface to transform $\theta_{Si}$ into $\theta_{air}$.

Figure 3:
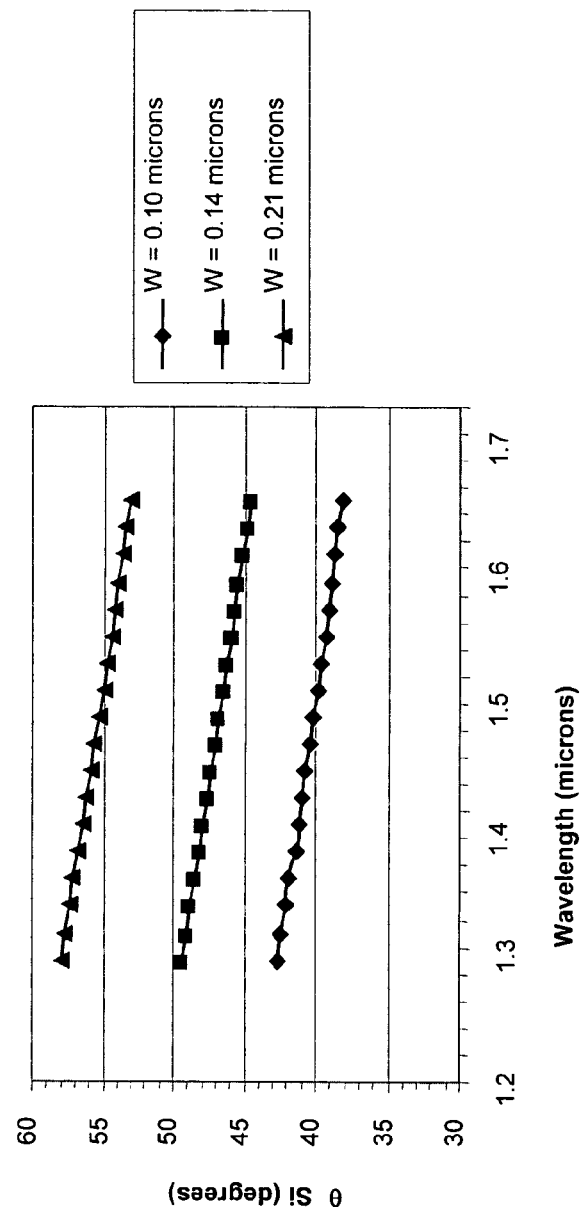
FIG. 3 is a graph illustrating the optical beam launch angle inside the prism coupler ($\theta_{Si}$) as a function of wavelength, the graph illustrating this data for three different, sub-micron thicknesses of an SOI layer optical waveguide.

Since the present invention is directed to providing coupling over a range of different wavelengths (the phrase "different wavelengths" is considered as including wavelength variation associated with single wavelength sources), the wavelength-dependent properties of prism coupling need to be explored and understood. FIG. 3 contains a graph illustrating the optimum values of $\theta_{Si}$ as a function of wavelength, for three different thicknesses of waveguide layer 12. This data illustrates that it is reasonable to approximate $\theta_{Si}$ as a linear function of wavelength over a fairly broad range of wavelengths (at least over the wavelength range of interest to optical communication systems, namely the range of 1.3–1.6 μm). Indeed, the linear relation between $\theta_{Si}$ and wavelength can be expressed as follows:

$$\theta_{Si}(W,\lambda) = \theta_{Si}(W,\lambda_c) + c(W)*(\lambda - \lambda_c),$$

where W is defined as the thickness of the waveguide layer, $\lambda_c$ is the center wavelength within the range, and c is the slope of the curve, the slope having values of approximately −0.0144°/nm for W=0.14 µm and 0.21 µm, and approximately −0.0129°/nm for W=0.10 µm. It follows that if a system is aligned for operation at the center wavelength $\lambda_c$, then the coupling will be maximized for $\theta_{Si}(W,\lambda_c)$. The coupling efficiency η for other wavelengths λ in the vicinity of $\lambda_c$ will then depend on the width of the coupling curve as a function of wavelength. If the coupling efficiency is denoted by η, then it can be shown that for an evanescent layer of constant thickness and refractive index, the coupling efficiency as a function of wavelength can be defined as follows:

$$\eta(\lambda) = \frac{\eta_{\max}(\alpha\omega_{PCS})}{1 + \frac{4\pi^2 n_{Si}^2 \omega_{PCS}^2}{(\alpha\omega_{PCS})^2} \frac{\{\sin[\theta_{Si}(\lambda_c) + c(\lambda - \lambda_c)] - \sin[\theta_{Si}(\lambda_c)]\}^2}{\lambda^2}},$$

where $\omega_{PCS}$ is the radius of the input beam at the prism coupling surface (see FIG. 2), α is defined as the leakage parameter, $\alpha\omega_{PCS}$ is the parameter that sets the coupling efficiency for an evanescent coupling layer of constant thickness and refractive index, and $n_{Si}$ is the refractive index of silicon (having a value of approximately 3.5 for the wavelength range of interest.

As shown by this relation, the principal source of wavelength sensitivity (defined as the slope "c" of the curves in FIG. 3) is the wavelength dependence on the angle $\theta_{Si}$. As evident from the graphs of FIG. 3, the slope c tends to decrease in magnitude as the waveguide layer thickness is decreased. Additionally, the slope may be decreased by increasing the refractive index of the evanescent coupling layer (e.g., using silicon nitride (n=2) in place of silicon dioxide (n=1.45)). In practice, it is difficult to find a material with a refractive index much greater than 2 that is also compatible with standard semiconductor processing techniques. Accordingly, the basis of the present invention is to further reduce wavelength sensitivity by using a lithographically patterned structure in association with the evanescent coupling region to produce an element that behaves as a thin film with a refractive index greater than 2, the actual value being dependent upon the properties of the patterned structure (e.g., a grating).

The mode angle of light in a silicon prism and silicon waveguide is determined by the following factors: (1) the polarization state of the incident light; (2) the wavelength of the incident light; (3) the thickness of the waveguide layer; and (4) the refractive indexes of the buried oxide layer, the silicon waveguide, the evanescent coupling layer and the prism. For the purposes of the present invention, it will be assumed that each input beam is incident on the prism facet at the same angle ($\theta_{air}$), regardless of wavelength. Accordingly, the presence of a grating may be used to improve the coupling efficiency over the entire wavelength range of interest, for the reasons discussed above. Advantageously, well-known semiconductor processing techniques may be used to form a grating directly into the evanescent coupling layer, thus exhibiting the desired characteristics in terms of feature size (such as period and depth) and specific pattern (such as aperiodic, slanted or chirped).

In particular, it is preferred that the grating structure be formed as a "sub-wavelength" grating that diffracts substantially all of the light into the zeroth order mode, where the term "sub-wavelength" generally refers to any grating with a period that is small compared to the incident vacuum wavelength. In accordance with the present invention, the suppression of the higher order results in forming a grating structure that is equivalent to a thin film with a refractive index $n_{eff}$ that is determined by the properties of the grating (e.g., material refractive index, grating period and grating height).

In most prism coupling applications, the evanescent coupling layer comprises a thin film of dielectric material interposed between the coupling surface of the prism and the upper surface of the waveguide. The formation of a sub-wavelength grating that supports only the zeroth order mode thus allows for the grating structure to be modeled as a simple thin film of refractive index $n_{eff}$. Therefore, the analysis of light coupling from the prism through the sub-wavelength grating to the waveguide is reduced to a conventional analysis of studying light coupled from a prism through a thin (evanescent coupling) layer to the waveguide. Advantageously, with appropriate grating constructions, the "equivalent" thin film (evanescent coupling layer plus grating) can possess refractive index properties that cannot be easily realized within only the evanescent coupling layer itself.

In order for the sub-wavelength grating to support only zeroth order operation, specific geometrical constraints regarding the grating structure must be implemented. First, the grating period (Λ) must be substantially less than the vacuum wavelength (λ) of the incident light. In order to suppress the higher diffraction orders (i.e., first order and above), the period of the grating must not exceed the cutoff value given by the following expression:

$$\Lambda_{cutoff} < \frac{\lambda}{\max(n_1, n_2) + n_1 \sin\theta},$$

where $n_1$ is the refractive index of prism coupler 18, $n_2$ is the refractive index of waveguide layer 12 and θ is the angle of incidence at prism coupler 18. Further, the depth h of the grating must be sufficiently large (relative to the vacuum wavelength λ) so as to ensure single mode rather than multi-mode diffraction. In particular, it has been shown that diffraction will occur essentially in the zeroth order when h/λ>0.2.

Figure 4:
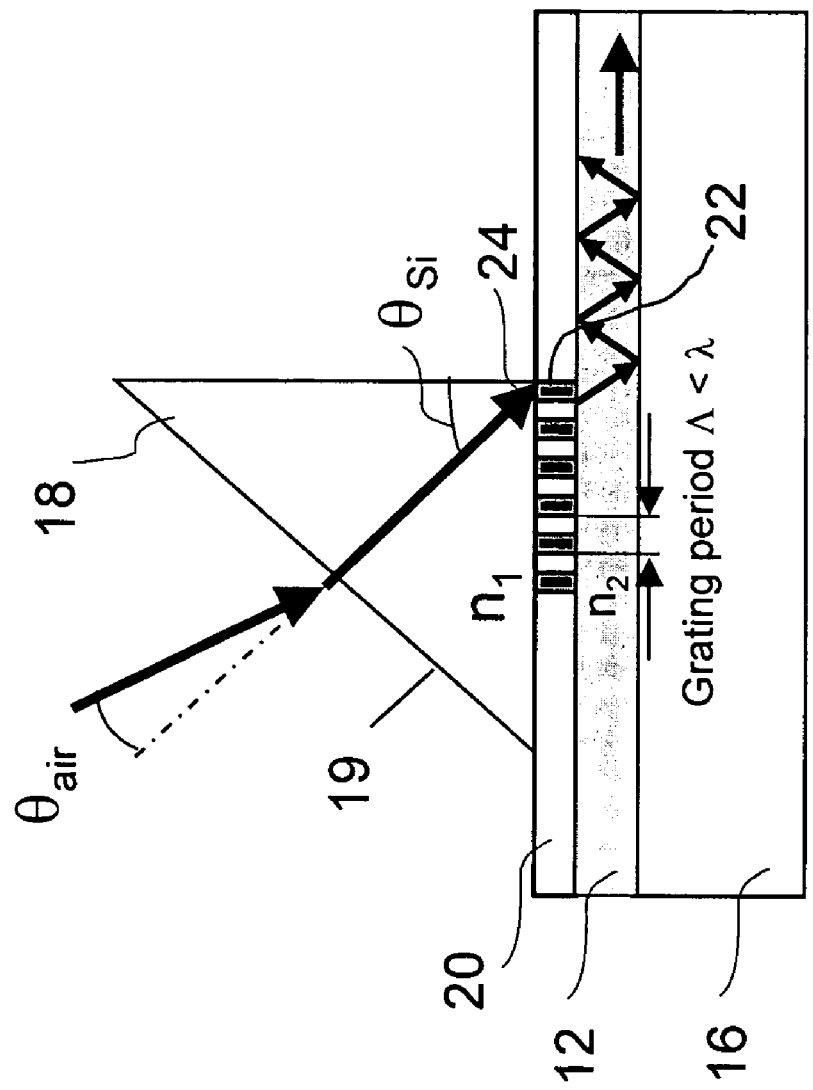
FIG. 4 illustrates, in simplified form, the inclusion of a sub-wavelength grating within an evanescent coupling layer, in accordance with the teaching of the present invention.

FIG. 4 illustrates, in simplified form, the inclusion of a sub-wavelength grating structure 22 within evanescent coupling layer 20 in accordance with the present invention, where grating 22 is formed along the extent of evanescent coupling layer 20 where the light beams will exit prism coupler 18. The grating period Λ is formed to be substantially less than the wavelength λ of the incident lightwave. In the computation of $\Lambda_{cutoff}$ for this particular embodiment of the present invention, $n_1 \approx n_2 \approx 3.5$ for silicon prism coupler 18 and silicon waveguide layer 12, and θ is the equivalent of $\theta_{Si}$ shown in FIG. 2. For the embodiment of FIG. 1, $\theta_{Si}$ can cover the range of 17°<$\theta_{Si}$<90°, with a smaller range of 38°<$\theta_{Si}$<60°, or Λ/λ≤0.18 ($\Lambda_{cutoff}$≤280 nm) being compatible with device fabrication methods and the wavelength range of interest. In particular, for an exemplary embodiment with $\theta_{Si}$=45° at λ=1.55 µm, the grating period should be less than or equal to 260 nm. For the same exemplary embodiment, the depth h of the grating must equal or exceed 310 nm to ensure single mode diffraction. For a relatively low value of $n_{eff}$, the optimal thickness of evanescent coupling layer 20 is 320 nm. For the preferred larger $n_{eff}$ values, a thicker layer for evanescent layer 20 will be required. As a result, gratings of sufficient depth can be successfully formed in the relatively thicker evanescent coupling layer 20.

In accordance with a further aspect of the present invention, the grating period may also be chirped, so as to smoothly transit the effective refractive index from that associated with the grating (for example, 2.7) to that of a nominal evanescent coupling layer (e.g., 1.45). Although grating 22 is illustrated as being formed within evanescent coupling layer 20, it is to be understood that a similar grating may be formed directly within the top surface of waveguide layer 12. In particular, the surface of the silicon material may be etched to form the desired grating pattern, with the etched openings filled with a material of different refractive index than silicon (where both "air" and "vacuum" may be considered as alternative materials). In general, as long as a grating is disposed in the light signal path between the coupling facet of the prism and the waveguide itself, its precise location can be modified as need be. Thus, while the present discussion is directed to the formation of a grating within an evanescent coupling layer, the broader applicability of the grating position should be kept in mind. Indeed, the ability to form a grating in either the waveguide surface or the coupling surface of the prism coupler may even eliminate the need for a separate evanescent coupling layer, if a satisfactory grating period and height can be formed using materials that provide the desired $n_{eff}$ for zeroth order diffraction.

Figure 5:
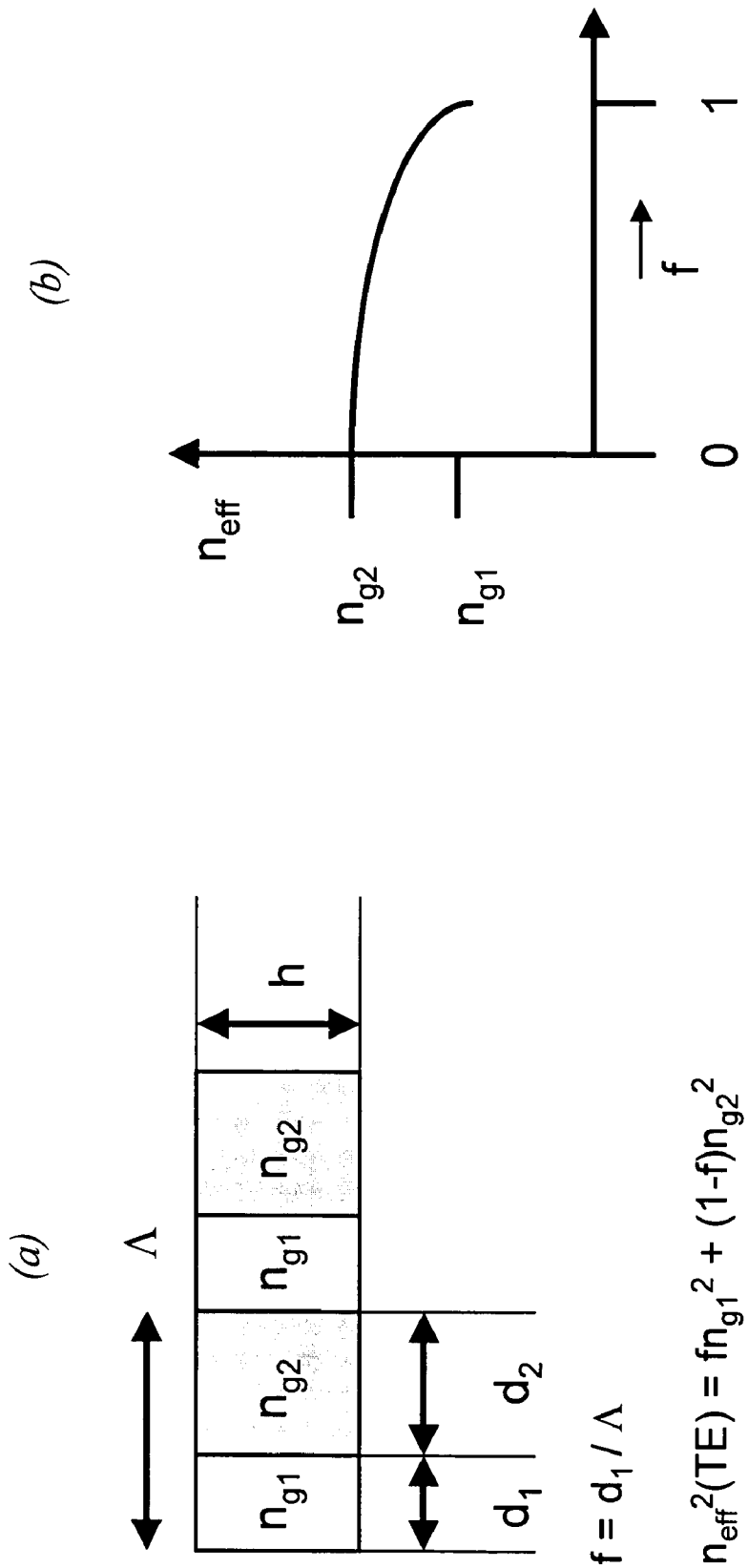
FIGS. 5(a) and (b) illustrate the relationship between the effective refractive index of the inventive coupling arrangement and the structure of the grating for a propagating TE mode.
Figure 6:
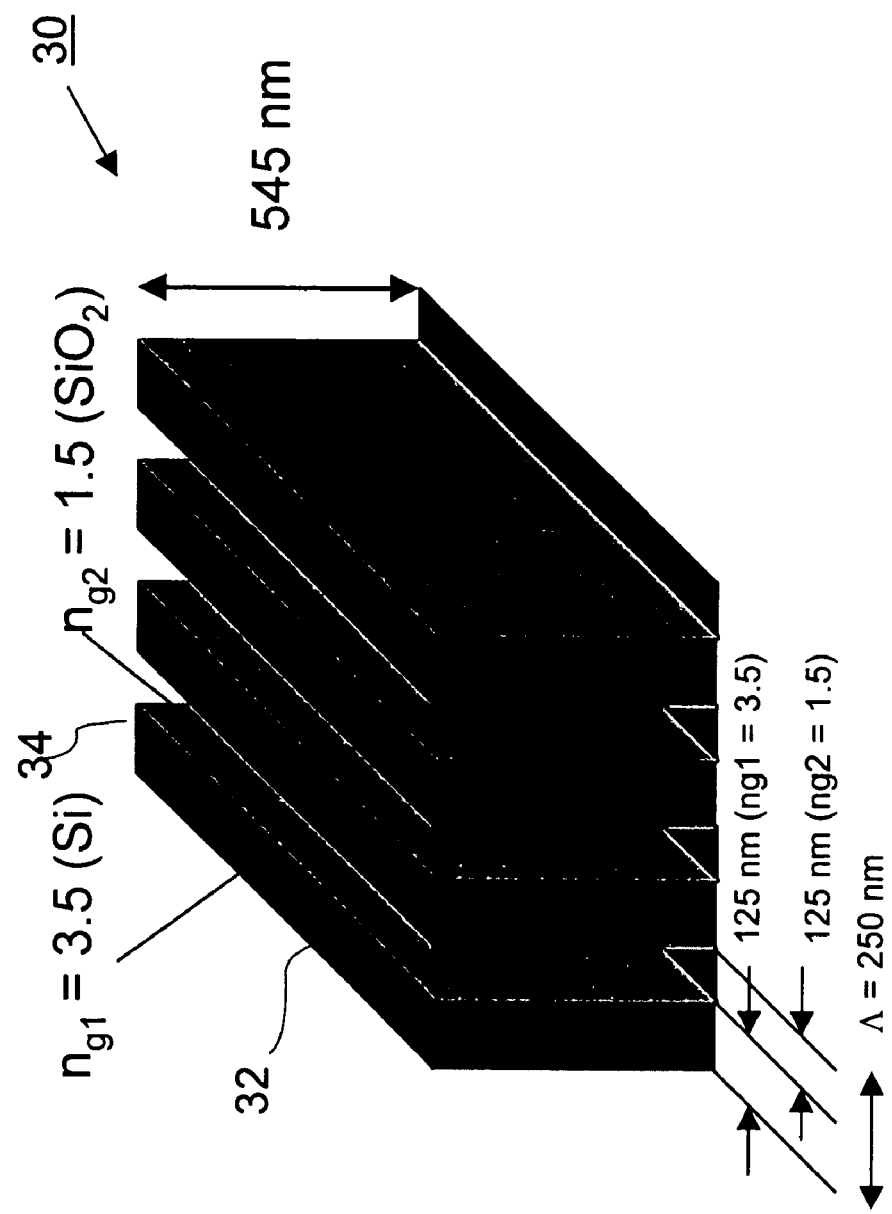
FIG. 6 illustrates an exemplary grating structure associated with the conditions of FIGS. 5(a) and (b)

FIGS. 5(a) and (b) illustrate the relationship between the effective refractive index of an evanescent coupling layer including a grating and the structure of the grating for the propagating TE mode (similar relationships exist, of course, for the TM mode). Referring to FIG. 5(a), an approximate formula for the effective refractive index is defined in terms of the refractive indexes of the two media (the evanescent coupling layer material ($n_{g1}$) and the grating material ($n_{g2}$)) and the duty cycle (the "fill factor", f) between the two:

$$n_{eff}^2(TE) = f n_{g1}^2 + (1-f) n_{g2}^2,$$

where $f = d_1/\Lambda$ and $d_1$ as illustrated in FIG. 5(a) is the portion of the period associated with the evanescent coupling layer. Referring to FIG. 5(b), the desired effective refractive index value may then be chosen by selecting an appropriate duty cycle, which can range between the extremes of $n_{g1}$ and $n_{g2}$. For example, for a duty cycle on the order of 50%, the etch width to form the grating is on the order of 110–130 nm, thus forming a grating period within the range of 220–260 nm, making it compatible with the $\Lambda/\lambda$ cutoff value at $\lambda=1.55$ µm. Features of this size can be formed using well-known silicon process techniques, such as e-beam lithography or uv photolithography. FIG. 6 illustrates one such exemplary grating structure 30, in this case utilizing an etched silicon grating structure that is subsequently filled with SiO$_2$, the grating etched to exhibit a 50% duty cycle, with the width of a silicon feature 32 being 125 nm and the width of an SiO$_2$ feature 34 also being 125 nm (therefore forming a grating period $\Lambda$ of 250 nm).

Figure 7:
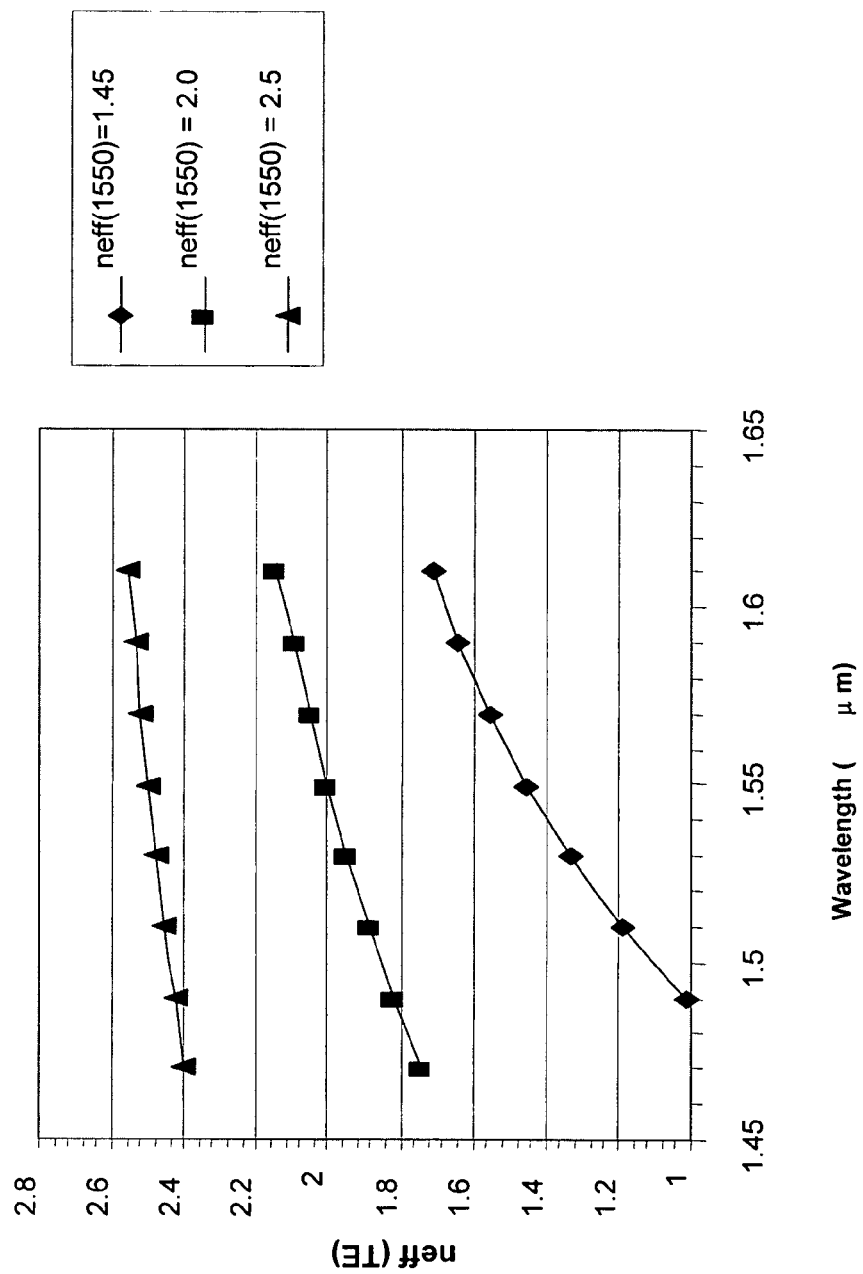
FIG. 7 contains a graph of the effective refractive index, as a function of wavelength, required to equalize the input coupling angle over a defined wavelength range for an exemplary embodiment of the present invention.
Figure 8:
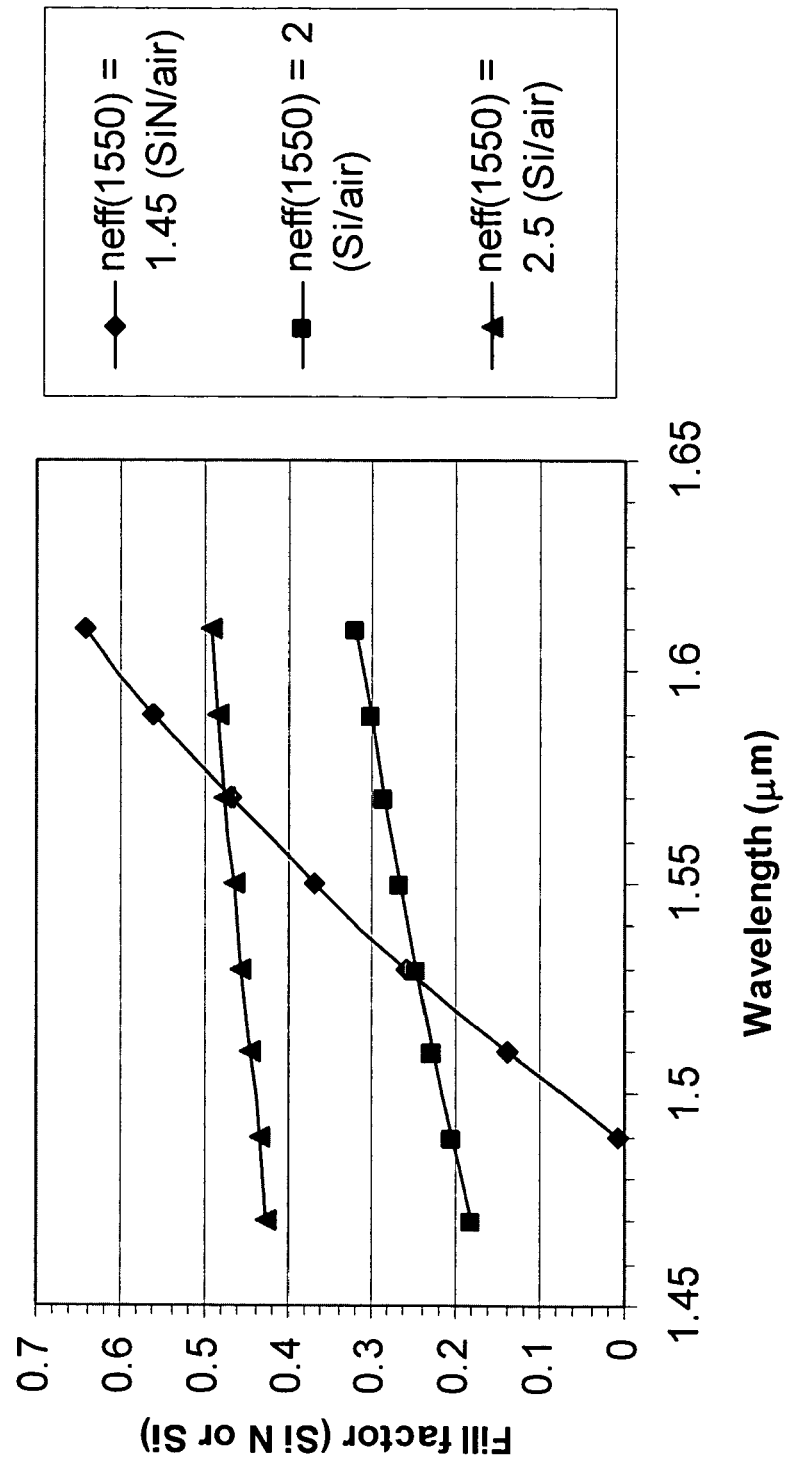
FIG. 8 is a graph of the grating "fill factor" required to produce three specific values of effective refractive index (each specific effective refractive index value associated with an exemplary set of materials forming the grating) for an exemplary wavelength band.

In accordance with the present invention, coupling over a broad wavelength range is developed by determining the range of $n_{eff}$ required to essentially equalize $\theta_{Si}$ for all wavelengths in the band under consideration (in the case of a single wavelength source, a determination of the upper and lower bounds of the wavelength variation is required). FIG. 7 is a graph of the values of $n_{eff}$ as a function of wavelength, that are required to equalize $\theta_{Si}$ across a particular wavelength band of interest. The results of FIG. 7 are shown for three different "baseline" values of $n_{eff}$ at the vacuum wavelength of 1.55 µm. Thus, the results of FIG. 7 can be interpreted as the refractive index that each wavelength needs to "see" in order to be efficiently coupled into silicon waveguiding layer 12. FIG. 8 contains a curve defining the particular construction, in terms of fill factor, for a grating comprising silicon nitride/air that produces the desired $n_{eff}$ for the case of $n_{eff}(1.55$ µm$)=1.45$. Since silicon nitride has a refractive index of 2 and air has a refractive index of 1, it is possible to cover the full range of $n_{eff}(\lambda)$ for this situation. In formation, a silicon nitride layer may be deposited over the silicon waveguide layer to define the evanescent coupling layer 20, then etched to form the desired silicon nitride/air grating structure 22.

As mentioned above, the grating structure of the present invention may be directly etched into the prism coupling surface of silicon prism coupler 18, or in the top portion of silicon waveguiding layer 12, thus forming a silicon/air grating using an $n_{g1}$ of 3.5 and an $n_{g2}$ of 1. The results for this combination are also illustrated in FIG. 8, which indicates the ability to use a more reasonable fill factor when the wavelength range of interest goes above 1.55 µm. As a variation of this embodiment, silicon dioxide (or silicon oxynitride) may be deposited in the silicon-etched structure, where the refractive index of silicon dioxide is 1.45. The structure may be evacuated, as an alternative, using the "vacuum" as the fill material. Any of these grating structures may be used to achieve an effective refractive index greater than 2.

The primary factor that will determine the coupling efficiency for a signal with a specific wavelength $\lambda_0$, incident at an angle $\theta_0$ on a sub-wavelength grating with a "graded" refractive index is the angular detuning factor over the spatial extent of the grating. In particular, at a region of the grating where the effective refractive index $n_{eff}$ is equal to $n_0$, the incidence angle $\theta_0$ is optimal for transmission into the waveguide, and relatively high coupling efficiency is achieved. However, at a nearby region where $n_{eff}=n_0+\Delta n_{eff}$, the optimal angle for transmission into the waveguide has now changed to $\theta_{opt}$, which is equal to $\theta_0 + \theta_{detune}$. Thus, the detuning angle $\theta_{detune}$ is defined to be the difference between the optimal angle of incidence for transmission and the actual angle of incidence. The magnitude of the angular detuning that limits the coupling efficiency of the prism waveguide assembly is determined primarily by the thickness of the evanescent coupling layer and the beam size. From this, it can be shown that the magnitude of $\theta_{detune}$ that leads to a 50% reduction (3 dB) in coupling efficiency can be defined as follows:

$$\theta_{detune}(3\text{dB}) = \frac{1}{n_{Si}\cos\theta_o} \frac{\alpha\omega_{PCS}}{2\pi} \frac{\lambda}{\omega_{PCS}}.$$

Figure 9:
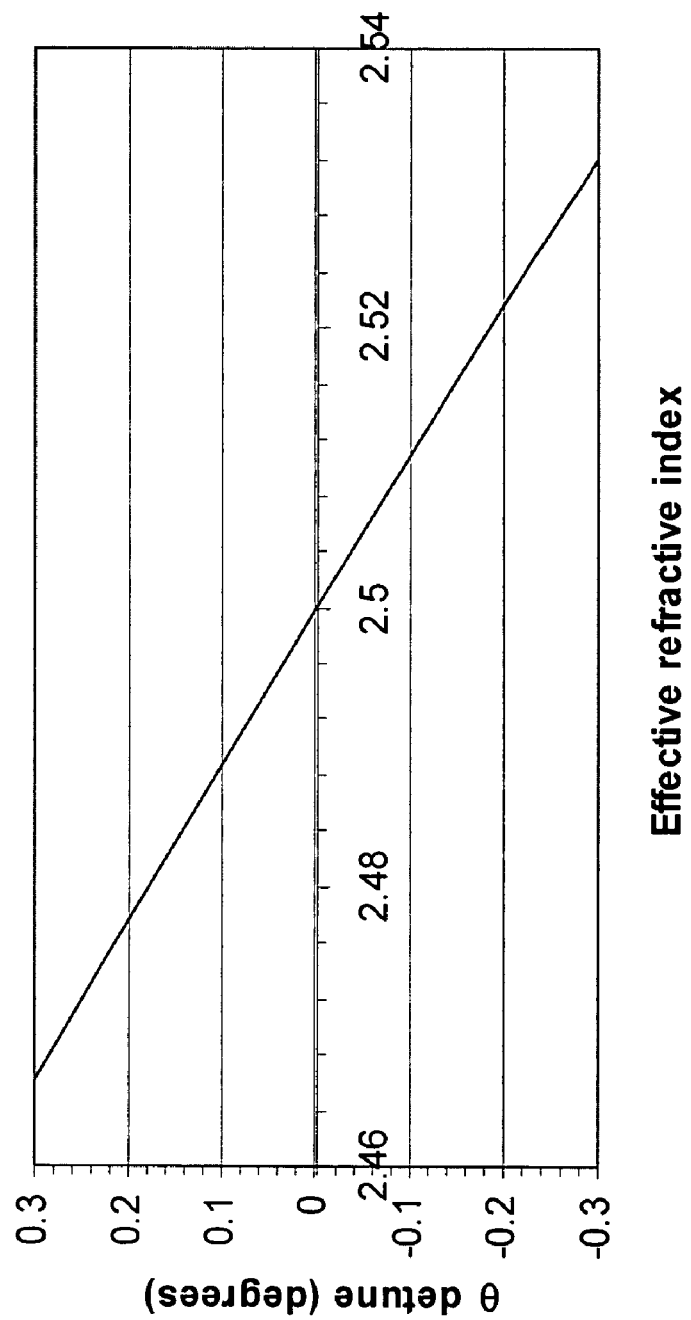
FIG. 9 contains a graph of the magnitude of $\theta_{detune}$ as a function of effective refractive index for an exemplary embodiment of the present invention.

Computing this value for the embodiment discussed above, $\theta_{detune}(3$ dB$)$ is approximately 0.13°. This value for $\theta_{detune}(3$ dB$)$ should be considered with the nominal value of $\theta_0$ to determine the optimal launch value $\theta_{opt}$. FIG. 9 is a graph of the magnitude of $\theta_{detune}$ as a function of the effective refractive index, as the index is varied from the optimum value of 2.5 for the wavelength $\lambda=1.55$ µm. If the allowable variation is bounded by 3 dB, which limits the maximum variation Of $\theta_{detune}$ to ±0.13°, then it can be seen that the effective refractive index $\Delta n_{eff}$ should not vary by more than 0.03 across the beam diameter if efficient coupling is achieved.

Figure 10:
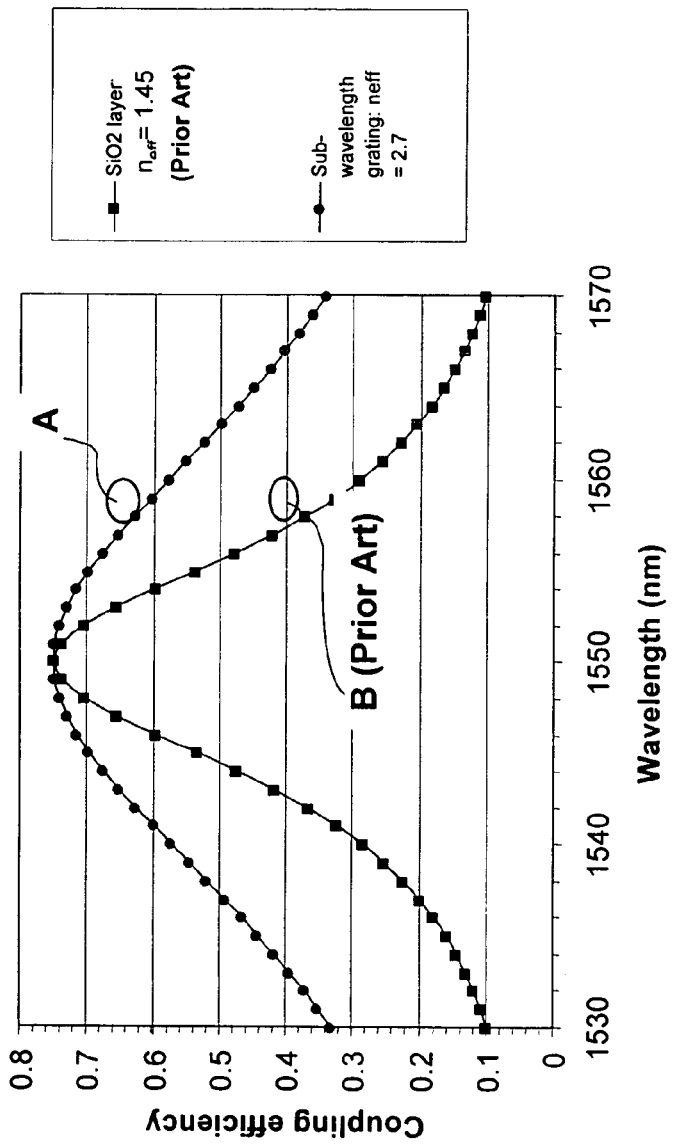
FIG. 10 contains a graph illustrating the coupling efficiency of a grating-enhanced arrangement of the present invention (curve A) as compared to the coupling efficiency associated with a conventional structure of the prior art (curve B)

FIG. 10 contains a graph (curve A) illustrating the coupling efficiency $\eta(\lambda)$ for an evanescent coupling layer of constant thickness (545 nm) including a grating structure, with an effective refractive index $n_{eff}$=2.7 over the wavelength range from 1.53 –1.57 μm. As shown, the peak coupling efficiency of 72% is achieved at the center wavelength value of 1550 nm, with the 3 dB points at 1.532 and 1.568 μm, providing a 3 dB bandwidth of 36 nm. For the sake of comparison, the coupling efficiency associated with a conventional, prior evanescent coupling layer with a constant refractive index of 1.45 is also shown (curve B). Notice that, in accordance with the present invention, the bandwidth of the coupling arrangement is increased by a factor of about 2.5 by increasing the refractive index (that is, the effective refractive index) of the coupling layer from 1.45 to 2.7 by utilizing the inventive grating in the evanescent coupling layer.

Thus, a principal advantage of using sub-wavelength gratings, in accordance with the present invention, stems from the fact that evanescent coupling layers of user-specified refractive index that minimize the mode angle variation with wavelength may be particularly designed and manufactured. While it may be true that certain higher refractive index materials may achieve similar results, there are cost, manufacturing and durability issues associated with these materials. By using the inventive sub-wavelength gratings, therefore, the same effect can be achieved using conventional semiconductor materials and lithography techniques.

While having a high value of refractive index for the evanescent coupling layer in the prism coupling region is important, it may be undesirable to maintain such a high refractive index value as the light continues to propagate within the silicon waveguide layer. Indeed, the confinement of the light within the waveguide will be reduced when the refractive index of the evanescent coupling layer is of a relatively high value. For this reason, it is preferable for the evanescent coupling layer to exhibit a refractive index closer to 1.5 over the portion of the device wafer where the remaining structures are located. The discontinuity in index from about 2.7 (at the coupling region) to 1.5 (at the confinement region) can be minimized by using a chirped grating to gradually decrease the refractive index value in transition between the coupling region and confinement region and thus prevent losses due to reflection. Alternatively, the desired change in refractive index may be achieved by varying the duty cycle of the grating structure to slowly decrease the effective refractive index from 2.7 to 1.5, as the light transitions from the prism coupling region to the waveguide confinement region.

FIG. 11 illustrates an exemplary embodiment of the present invention utilizing a grating structure 40 that produces the desired taper in refractive index profile by modifying the duty cycle of grating 40 along the length of evanescent coupling layer 20 from the input coupling region to the confinement region of the propagating signal further along waveguide layer 12. As shown particularly in the exploded view of the structure, grating 40 includes sections of fill material 42 disposed within etched regions of evanescent coupling layer 20. As shown, the period Λ of grating 40 remains constant, but the "fill factor" f is modified so as to reduce the portion of fill material 42 along each cycle (i.e., modifying the duty cycle) and eventually eliminate the presence of any fill material 42 along evanescent coupling layer 20 (therefore returning the effective refractive index to the nominal refractive index of evanescent coupling layer 20). While only a few cycles of the grating structure are illustrated, it is to be understood that a practical grating structure would include tens, if not hundreds, of such cycles.

FIG. 12 illustrates an alternative grating structure 50 that is capable of providing a range of effective refractive indexes by virtue of exhibiting a range of duty cycle variations across the width (y-direction) of grating structure 50. FIG. 12(a) is a top view of the exemplary grating structure 50, where triangular regions of fill material 52 are disposed within etched openings in evanescent layer 20. The triangular shape thus forms a variety of different duty cycles, depending on the fraction of the cycle containing fill material 52, each duty cycle associated with a different effective refractive index. FIG. 12(b) illustrates a plot of the effective refractive index profile associated with grating 50. Therefore, by controlling/scanning the input angle of a light beam applied to this structure, the launch angle associated with maximum coupling efficiency for a particular wavelength, such as $\lambda_1$ or $\lambda_2$, can be determined and thereafter "fixed" for subsequent use of the device at that wavelength. Since such a configuration naturally has a range of duty cycles, it eases the constraints on having to manufacture a very specific duty cycle, since the region exhibiting the required duty cycle can be found by scanning during alignment (as indicated by the double-ended arrow on FIG. 12(a)).

While the above-described embodiments of the present invention have addressed the problem of input coupling efficiency, it is to be understood that the same principles may be applied to out-coupling of a multiple wavelength optical signal from the surface silicon waveguide through an output coupling prism toward an output optical device (such as, for example, an optical fiber or optical receiver). FIG. 1 illustrates the specifics of the out-coupling arrangement. In accordance with the present invention, the addition of a grating structure at the output prism coupling surface functions to correct the multiple exit angles associated with multiple wavelength propagating signals. The grating of the present invention reduces the "fan-out" of exit angles associated with the different wavelengths, thus improving coupling efficiency into the output device. Again, the use of a chirped grating can be used to perform beam shaping and provide additional matching to subsequent output devices.

Indeed, the subject matter of the present invention should be considered as limited only by the scope of the claims appended hereto.

What is claimed is:

1. An arrangement for providing optical coupling between a multi-wavelength optical signal and a relatively thin, planar silicon optical waveguide, the arrangement comprising a prism coupling structure disposed over the evanescent coupling layer, the prism coupling structure including at least one coupling facet oriented at a predetermined angle with respect to the waveguide surface for intercepting optical signals within a defined wavelength range and a prism coupling surface disposed above and essentially parallel to the upper surface of the relatively thin, planar optical waveguide for coupling the multi-wavelength optical signal into the relatively thin, planar optical waveguide; and a grating structure disposed between the prism coupling surface and the planar silicon optical waveguide, the grating structure having a predetermined grating period (Λ) less than the wavelength (λ) of the multi-wavelength optical signal and a predetermined height (h) so as to transmit substantially in the zeroth order diffraction mode over the defined wavelength range and produce a predetermined effective refractive index profile in at least the region along the prism coupling surface that increases optical coupling efficiency over the defined wavelength range, wherein at least one of the period and duty cycle of the grating changes in value along a longitudinal axis thereof so as to create an effective refractive index profile varies monotonically about an optimum effective refractive index value associated with a center wavelength of the defined wavelength range.

2. The arrangement as defined in claim 1 wherein the defined wavelength range is a subset of wavelengths within the range of 1.10 µm to 1.65 µm.

3. The arrangement as defined in claim 1 wherein the arrangement further comprises
an evanescent coupling layer disposed between the relatively thin, planar optical waveguide and the coupling surface of the prism coupling structure, the evanescent coupling layer, in combination with the grating structure, providing the desired predetermined effective refractive index profile.

4. The arrangement as defined in claim 3 wherein the grating structure is formed within the surface of the evanescent coupling layer at the interface with the prism coupling structure.

5. The arrangement as defined in claim 3 wherein the grating structure is formed within the surface of the evanescent coupling layer at the interface with the relatively thin, planar optical waveguide.

6. The arrangement as defined in claim 3 wherein the relatively thin, planar optical waveguide comprises silicon and the evanescent coupling layer comprises silicon dioxide.

7. The arrangement as defined in claim 3 wherein the relatively thin, planar optical waveguide comprises silicon and the evanescent coupling layer comprises silicon nitride.

8. The arrangement as defined in claim 3 wherein the evanescent coupling layer exhibits a substantially constant thickness.

9. The arrangement as defined in claim 3 wherein the evanescent coupling layer is disposed to couple an input optical beam into the relatively thin, planar optical waveguide and the thickness of the input evanescent coupling layer varies monotonically such that an initial coupled portion of the input optical beam intercepts a thickness that is less than the thickness intercepted by a central coupled portion of the input optical beam, and a final coupled portion of the input optical beam intercepts a thickness that is greater than the thickness intercepted by the central coupled portion of the input optical beam.

10. The arrangement as defined in claim 1 wherein the grating structure is formed within a surface portion of the relatively thin, planar optical waveguide.

11. The arrangement as defined in claim 10 wherein the grating is etched into the surface portion, the grating comprising alternating sections of waveguide material and air.

12. The arrangement as defined in claim 10 wherein the grating is etched into the surface portion and the etched cavities are filled with a material having a lower refractive index than the optical waveguide material.

13. The arrangement as defined in claim 12 wherein the relatively thin, planar optical waveguide comprises silicon and the etched cavities are filled with a material selected from the group consisting of: silicon nitride, silicon dioxide, silicon oxynitride, air and vacuum.

14. The arrangement as defined in claim 1 wherein the grating structure is formed within the prism coupling surface of the prism coupling structure.

15. The arrangement as defined in claim 14 wherein the grating is etched into the prism coupling surface, the grating comprising alternating sections of prism material and air.

16. The arrangement as defined in claim 14 wherein the grating is etched into the prism coupling and the etched cavities are filled with a material having a lower refractive index than the prism coupling structure.

17. The arrangement as defined in claim 16 wherein the prism coupling structure comprises silicon and the etched cavities are filled with a material selected form the group consisting of: silicon nitride, silicon dioxide, silicon oxynitride, air and vacuum.

18. The arrangement as defined in claim 1 wherein the duty cycle of the grating structure is constant.

19. The arrangement as defined in claim 1 wherein the duty cycle of the grating structure changes in value to create a desired effective refractive index profile such that the effective refractive index varies monotonically from a first, relatively high value to a second, nominal value along the extent of the relatively thin, planar optical waveguide.

20. The arrangement as defined in claim 1 wherein the period of the grating is constant.

21. The arrangement as defined in claim 1 wherein the period of the grating changes in value to create a predetermined effective index profile that varies monotonically from a first relatively high value to a second, nominal value along the extent of the silicon optical waveguide, thus forming a chirped input grating.

22. The arrangement as defined in claim 1 wherein the period of the grating changes in value to create a predetermined effective refractive index profile that varies monotonically from a first, nominal value in at least a portion of the prism coupling surface to a second, relatively high value along the extent of the silicon optical waveguide, thus forming a chirped output grating.

23. The arrangement as defined in claim 1 wherein the at least one coupling facet comprises an input coupling facet for intercepting a plurality of input optical signals within the defined wavelength range and directing the plurality of signals through the grating structure and into the relatively thin, planar silicon optical waveguide.

24. The arrangement as defined in claim 1 wherein the at least one coupling facet comprises an output coupling facet, the grating structure functioning to modify the waveguide exit angle associated with each different wavelength signal.

* * * * *